US007444129B2

(12) United States Patent
Chu et al.

(10) Patent No.: US 7,444,129 B2
(45) Date of Patent: Oct. 28, 2008

(54) COMB-LINE WIRELESS FILTER

(75) Inventors: Teng-Huei Chu, Tu-Cheng (TW); Cho-Ju Chung, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 428 days.

(21) Appl. No.: 11/198,646

(22) Filed: Aug. 5, 2005

(65) Prior Publication Data

US 2006/0028304 A1 Feb. 9, 2006

(30) Foreign Application Priority Data

Aug. 6, 2004 (TW) .............................. 93212537 U

(51) Int. Cl.
*H04B 1/10* (2006.01)

(52) U.S. Cl. ....................... 455/307; 455/213; 455/286; 455/299; 455/306; 333/202; 333/203; 333/204; 333/205

(58) Field of Classification Search ................. 455/307, 455/213, 286, 299, 306; 333/202, 203, 204, 333/205
See application file for complete search history.

(56) References Cited

U.S. PATENT DOCUMENTS 5,888,942 A * 3/1999 Matthaei ..................... 505/210
6,020,799 A * 2/2000 Ishizaki et al. .............. 333/204
6,208,226 B1 * 3/2001 Chen et al. .................. 333/202
6,240,144 B1 * 5/2001 Ha ............................ 375/297
6,653,912 B2 * 11/2003 Robinson et al. ............ 333/132
7,256,666 B2 * 8/2007 Uchida et al. ............... 333/202
2003/0222732 A1 * 12/2003 Matthaei .................. 333/99 S

FOREIGN PATENT DOCUMENTS

CN 1317847 A 10/2001

* cited by examiner

*Primary Examiner*—Sanh D Phu
(74) *Attorney, Agent, or Firm*—Morris, Manning & Martin LLP; Tim Tingkang Xia

(57) ABSTRACT

A comb-line wireless filter (5) includes an input end (505*a*), an output end (505*b*), a first transmission line (501*b*), a second and third transmission line (501*a*, 501*c*) each having a curved shape, and a first, second, and third capacitor (503*b*, 503*a*, 503*c*). The first transmission line has a first transmission line part and a second transmission line part. The second transmission line and the third transmission line are separately on the two sides of the first transmission line part of the first transmission line. The input end and the output end are separately connected to first ends of the second transmission line and the third transmission line. The capacitors are separately connected to first ends of the transmission lines. According to the curved shape of the second transmission line and the third transmission line, the size of the comb-line wireless filter is significantly reduced.

10 Claims, 3 Drawing Sheets

COMB-LINE WIRELESS FILTER

BACKGROUND OF THE INVENTION

1. Field of the Invention

The present invention pertains to filters used in electronic communication devices, and particularly to comb-line filters applicable to wireless communication devices and systems.

2. Prior Art

Generally, wireless communication devices such as mobile phones or notebook computers with mini-PCI/PCMCIA/USB wireless cards are designed to be as small as practicable, so that users can conveniently take the wireless communication devices anywhere they want to go. Since wireless filters are necessary components of wireless communication devices, one solution to reduce the size of a wireless communication device is to reduce the size of the wireless filter used therein.

In one such solution, China Patent Publication No. 1,317,847, published on Oct. 17, 2001, discloses a comb-line wireless filter. FIG. 3 herein is a schematic representation of a structure of that comb-line wireless filter. The comb-line wireless filter comprises a filtering top layer 100, and a grounded bottom layer 120 for supporting the filtering top layer 100. A pair of micro-strip lines 108*a*, 108*b* are fixed on the filtering top layer 100 in a parallel and linear manner. The pairs of micro-strip lines 108*a*, 108*b* are connected to the grounded bottom layer 120 by way of two holes 104*a*, 104*b*, and coupled with two capacitance compensators 110*a*, 110*b* through two holes 102*a*, 102*b*. The micro-strip line 108*a* is connected to an input end 106*a*, and the micro-strip line 108*b* is connected to an output end 106*b*. It is possible to add some parallel micro-strip lines between the micro-strip line 108*a* and the micro-strip line 108*b*. If this is done, relevant holes and capacitance compensators should be added.

The above-described micro-strip lines 108*a*, 108*b* are designed in the parallel and linear manner. When the comb-line wireless filter needs the micro-strip lines 108*a*, 108*b* to be of a given minimum length, it is problematic to minimize the overall size of the comb-line wireless filter. Consequently, what is needed is a comb-line wireless filter having transmission lines (strip lines or micro-strip lines) with a configuration that can reduce the overall size of the comb-line wireless filter.

SUMMARY OF THE INVENTION

Accordingly, a primary object of the present invention is to provide a comb-line wireless filter having transmission lines with a compact shape.

In order to fulfill the above-mentioned primary object, the present invention provides a comb-line wireless filter. The comb-line wireless filter comprises: an input end for receiving wireless signals; an output end for radiating wireless signals; a first transmission line having a first transmission line part and a second transmission line part, wherein the second transmission line part is grounded; a first capacitor, one end of the first capacitor being connected to the first transmission line part of the first transmission line, and the other end of the first capacitor being grounded; a second transmission line having a curved shape on one side of the first transmission line part of the first transmission line, a first end of the second transmission line being connected to the input end, and a second end of the second transmission line being grounded; a second capacitor, one end of the second capacitor being connected to the first end of the second transmission line, and the other end of the second capacitor being grounded; a third transmission line having a curved shape on an opposite side of the first transmission line part of the first transmission line, a first end of the third transmission line being connected to the output end, and a second end of the third transmission line being grounded; and a third capacitor, one end of the third capacitor being connected to the first end of the third transmission line, and the other end of the third capacitor being grounded.

Other objects, advantages and novel features of the present invention will become more apparent from the following detailed description when taken in conjunction with the accompanying drawings, in which:

DETAILED DESCRIPTION OF THE EMBODIMENTS

Figure 1:
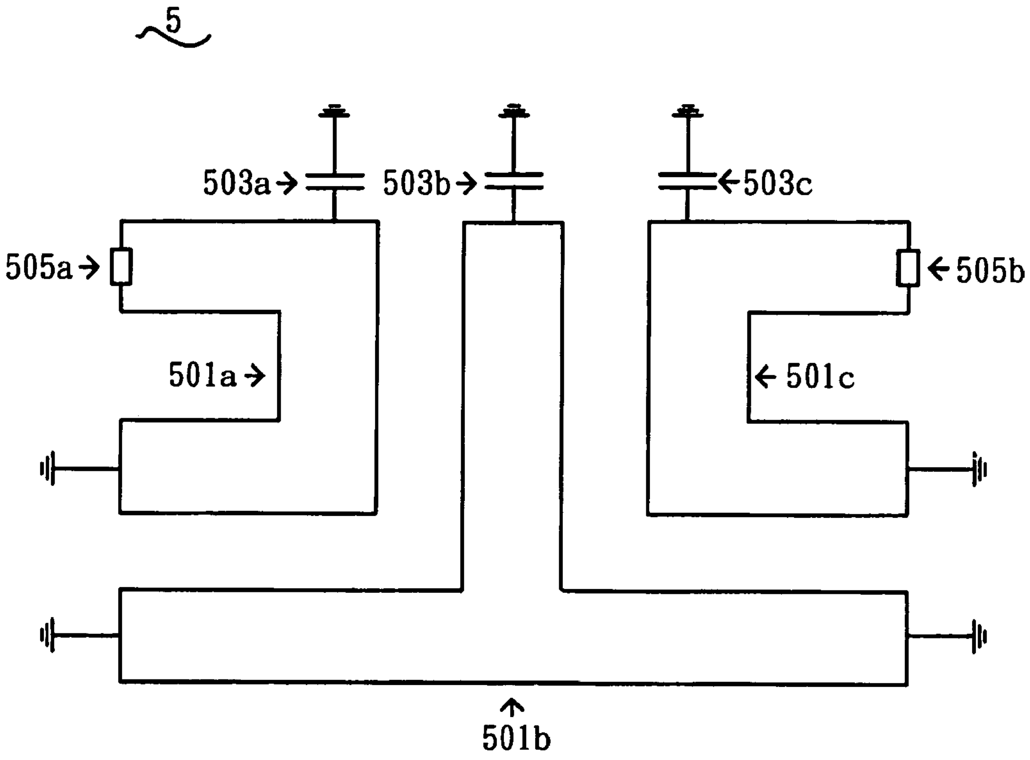
FIG. 1 is a schematic diagram of a structure of an exemplary comb-line wireless filter according to the present invention.

FIG. 1 is a schematic diagram of a structure of an exemplary comb-line wireless filter 5 of a wireless communication system according to a preferred embodiment of the present invention. In the preferred embodiment, the comb-line wireless filter 5 comprises three transmission lines 501*a*, 501*b*, 501*c*, three capacitors 503*a*, 503*b*, 503*c*, an input end 505*a* for receiving wireless signals, and an output end 505*b* for radiating wireless signals. The transmission line 501*a* has a curved shape (or a "C" shape, which is only schematically shown in FIG. 1). An upper end of the transmission line 501*a* is connected to the input end 505*a* and to one end of the capacitor 503*a*, and a lower end of the transmission line 501*a* is grounded. The other end of the capacitor 503*a* is grounded. The transmission line 501*b* includes a vertical transmission line part, and a horizontal transmission line part perpendicularly connected to the vertical transmission line part. An upper end of the vertical transmission line part is connected to one end of the capacitor 503*b*, and the horizontal transmission line part is grounded. The other end of the capacitor 503*b* is grounded. The transmission line 501*c* has a curved shape (or a "C" shape, which is only schematically shown in FIG. 1). An upper end of the transmission line 501*c* is connected to the output end 505*b* and to one end of the capacitor 503*c*, and a lower end of the transmission line 501*c* is grounded. The other end of the capacitor 503*c* is grounded. The transmission line 501*a* is on a left side of the vertical transmission line part of the transmission line 501*b*. The transmission line 501*c* is on a right side of the vertical transmission line part of the transmission line 501*b*. In addition, the transmission line 501*a* is symmetrical to the transmission line 501*c* about the vertical transmission line part of the transmission line 501*b*.

The transmission lines of the comb-line wireless filter 5 have symmetrical and curved shapes. When the transmission lines are designed with a given length, the size of the comb-line wireless filter 5 is smaller than sizes of corresponding comb-line wireless filters having transmission lines with parallel and linear shapes.

In the preferred embodiment, the upper end and the lower end of the transmission line 501*a* are curved substantially toward a direction away from the left side of the vertical transmission line part of the transmission line 501*b*. Correspondingly, the upper end and the lower end of the transmission line 501*c* are curved substantially toward a direction away from the right side of the vertical transmission line part of the transmission line 501*b*. In addition, a distance from the transmission line 501*a* or 501*c* to the transmission line 501*b* influences an operation bandwidth of the comb-line wireless filter 5; that is, the greater the distance, the smaller the operation bandwidth. Thus, optimal performance of the comb-line wireless filter 5 can be obtained by configuring the distance from the transmission line 501*a* or 501*c* to the transmission line 501*b*.

In the preferred embodiment, the comb-line wireless filter 5 comprises only three transmission lines 501*a*, 501*b*, 501*c*. In an alternative embodiment, the number of transmission lines can be increased. In particular, the number of transmission lines should be increased in pairs, so as to form a symmetrical shape for the comb-line wireless filter 5. For example, an additional transmission line having a shape similar to that of the transmission line 501*a* can be configured between the transmission line 501*a* and the vertical transmission line part of the transmission line 501*b*. Correspondingly, a capacitor is added to connect to an upper end of the additional transmission line. Further, in order to form a symmetrical shape for the comb-line wireless filter 5, it is also necessary to configure another additional transmission line having a shape similar to that of the transmission line 501*c* between the transmission line 501*c* and the vertical transmission line part of the transmission line 501*b*. Correspondingly, another capacitor is added to connect to an upper end of the other additional transmission line. Moreover, the horizontal transmission line part of the transmission line 501*b* is lengthened with an increase in the number of transmission lines. A transmission line located at the left side of the vertical transmission line part of the transmission line 501*b* and which is farthest from the vertical transmission line part of the transmission line 501*b* is connected to the input end 505*a*. A transmission line located at the right side of the vertical transmission line part of the transmission line 501*b* and which is farthest from the vertical transmission line part of the transmission line 501*b* is connected to the output end 505*b*.

Figure 2:
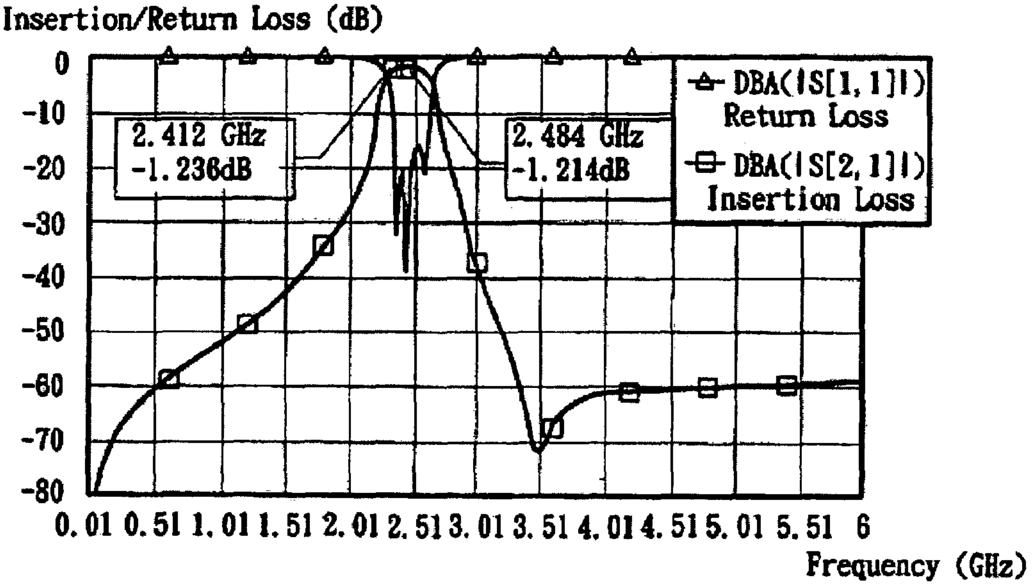
FIG. 2 is a diagram showing a relationship between insertion/return loss and frequency of a signal traveling through the comb-line wireless filter of FIG. 1.
Figure 3:
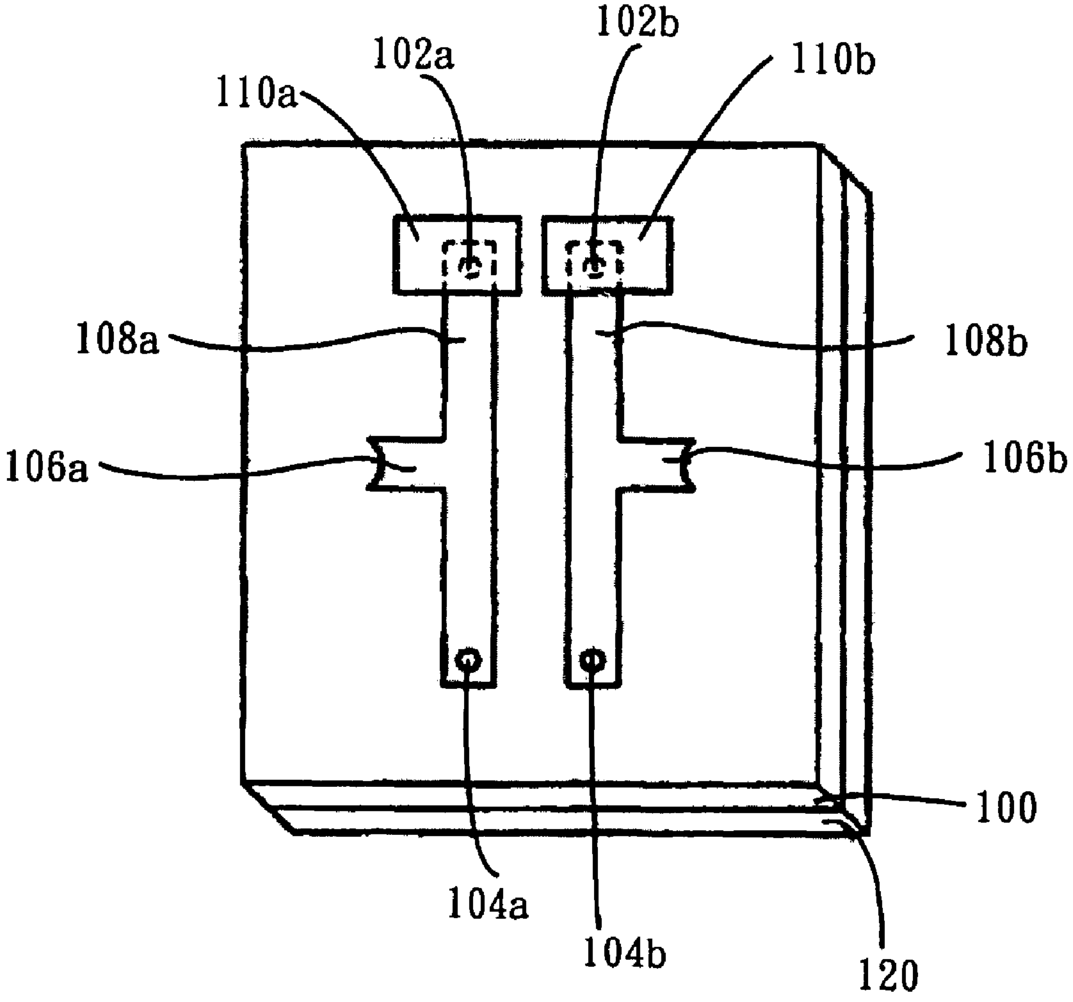
FIG. 3 (PRIOR ART)
FIG. 3 is a schematic diagram of a structure of a conventional comb-line wireless filter.

FIG. 2 is a diagram showing a relationship between insertion/return loss and frequency of a signal traveling through the comb-line wireless filter 5. The horizontal abscissa represents the frequency (GHz) of a signal traveling through the comb-line wireless filter 5, and the vertical ordinate represents the insertion/return loss (dB) of the comb-line wireless filter 5. The insertion loss indicates a relationship between an input power and an output power of the signal traveling through the comb-line wireless filter 5, and is represented by the following equation: Insertion Loss=−10·×·Log [(Input Power)/(Output Power)]. When the signal travels through the comb-line wireless filter 5, a part of the input power is returned to a source of the signal. The part of the input power returned to the source of the signal is called return power. The return loss indicates a relationship between the input power and the return power of the signal traveling through the comb-line wireless filter 5, and is represented by the following equation: Return Loss=−10·×·Log [(Input Power)/(Return Power)].

For a band-pass filter, when an output power of a signal in a band-pass frequency range is close to an input power of the signal, and a return power of the signal is small, it means that a distortion of the signal is small and the performance of the band-pass filter is good. That is, the smaller the absolute value of the insertion loss of the signal, the bigger the absolute value of the return loss of the signal, and the better the performance of the band-pass filter. As seen in FIG. 2, the comb-line wireless filter 5 has good performance as a band-pass filter. The absolute value of the insertion loss of the signal in the band-pass frequency range is close to a value of 0, and the absolute value of the return loss of the signal is greater than a value of 10. For example, when the frequency of the signal traveling through the comb-line wireless filter 5 is equal to 2.412 GHz or 2.484 GHz, the insertion loss thereof is −1.236 dB or −1.214 dB respectively.

While various embodiments have been described above, it should be understood that they have been presented by way of example only and not by way of limitation. Thus the breadth and scope of the present invention should not be limited by the above-described exemplary embodiments, but should be defined only in accordance with the following claims and their equivalents.

We claim:

1. A comb-line wireless filter comprising:

an input end for receiving wireless signals;

an output end for radiating wireless signals;

a first transmission line having a first transmission line part and a second transmission line part, wherein the second transmission line part is grounded;

a first capacitor, one end of the first capacitor being connected to the first transmission line part of the first transmission line, and the other end of the first capacitor being grounded;

a second transmission line having a curved shape on one side of the first transmission line part of the first transmission line, a first end of the second transmission line being connected to the input end, and a second end of the second transmission line being grounded;

a second capacitor, one end of the second capacitor being connected to the first end of the second transmission line, and the other end of the second capacitor being grounded;

a third transmission line having a curved shape on an opposite side of the first transmission line part of the first transmission line, a first end of the third transmission line being connected to the output end, and a second end of the third transmission line being grounded; and a third capacitor, one end of the third capacitor being connected to the first end of the third transmission line, and the other end of the third capacitor being grounded.

2. The comb-line wireless filter as claimed in claim 1, wherein the second transmission line is symmetrical to the third transmission line about the first transmission line.

3. The comb-line wireless filter as claimed in claim 1, wherein the first end and the second end of the second transmission line are curved substantially toward a direction away from said one side of the first transmission line.

4. The comb-line wireless filter as claimed in claim 3, wherein the first end and the second end of the third transmission line are curved substantially toward a direction away from said opposite side of the first transmission line.

5. The comb-line wireless filter as claimed in claim 1, wherein the first transmission line part of the first transmission line is perpendicularly connected to the second transmission line part of the first transmission line.

6. A comb-line wireless filter comprising:

an input end for receiving wireless signals;

an output end for radiating wireless signals;

a first transmission line having a first transmission line part and a second transmission line part, wherein the second transmission line part is grounded;

a first capacitor, one end of the first capacitor being connected to the first transmission line part of the first transmission line, and the other end of the first capacitor being grounded;

at least one second transmission line having a curved shape and being located at one side of the first transmission line part of the first transmission line, a first end of the at least one second transmission line that is farthest from the first transmission line part of the first transmission line being connected to the input end, and a second end of the at least one second transmission line being grounded;

at least one second capacitor, one end of the at least one second capacitor being respectively connected to the first end of the at least one second transmission line, and the other end of the at least one second capacitor being grounded;

at least one third transmission line having a curved shape and being located at an opposite side of the first transmission line part of the first transmission line, a first end of the at least one third transmission line that is farthest from the first transmission line part of the first transmission line being connected to the output end, and a second end of the at least one third transmission line being grounded; and at least one third capacitor, one end of the at least one third capacitor being respectively connected to the first end of the at least one third transmission line, and the other end of the at least one third capacitor being grounded.

7. The comb-line wireless filter as claimed in claim 6, wherein the at least one second transmission line is symmetrical to the at least one third transmission line about the first transmission line.

8. The comb-line wireless filter as recited in claim 6, wherein the first end and the second end of the at least one second transmission line are curved substantially toward a direction away from said one side of the first transmission line part of the first transmission line.

9. The comb-line wireless filter as recited in claim 8, wherein the first end and the second end of the at least one third transmission line are curved substantially toward a direction away from said opposite side of the first transmission line part of the first transmission line.

10. The comb-line wireless filter as recited in claim 6, wherein the first transmission line part of the first transmission line is perpendicularly connected to the second transmission line part of the first transmission line.

* * * * *